US010097670B2

(12) United States Patent
Garg et al.

(10) Patent No.: US 10,097,670 B2
(45) Date of Patent: Oct. 9, 2018

(54) FACILITATING PERSONALIZED VIDEO MESSAGES USING PEER-TO-PEER COMMUNICATIONS

(71) Applicant: Adobe Systems Incorporated, San Jose, CA (US)

(72) Inventors: Tulika Garg, Uttar Pradesh (IN); Neeraj Goel, Uttar Pradesh (IN); Mohit Srivastava, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 137 days.

(21) Appl. No.: 15/159,121

(22) Filed: May 19, 2016

(65) Prior Publication Data

US 2017/0339254 A1    Nov. 23, 2017

(51) Int. Cl.
*G06F 15/16*     (2006.01)
*G06F 15/173*    (2006.01)
*H04L 29/06*     (2006.01)
*H04L 29/08*     (2006.01)
*G06Q 30/02*     (2012.01)

(52) U.S. Cl.
CPC .............. *H04L 67/42* (2013.01); *H04L 67/02* (2013.01); *H04L 67/104* (2013.01); *G06Q 30/0277* (2013.01)

(58) Field of Classification Search
CPC .............................. H04L 67/104; H04L 67/02
USPC ......................................... 709/217, 224, 231
See application file for complete search history.

(56) References Cited

U.S. PATENT DOCUMENTS

| | | | |
|---|---|---|---|
| 2006/0294213 A1* | 12/2006 | Saridakis | H04L 63/029 709/223 |
| 2015/0363704 A1* | 12/2015 | Yong | H04L 67/16 706/46 |
| 2017/0142226 A1* | 5/2017 | De Foy | H04L 67/327 |
| 2017/0264712 A1* | 9/2017 | Magnusson, Jr. | H04L 67/327 |
| 2017/0288987 A1* | 10/2017 | Pasupathy | H04L 43/028 |

* cited by examiner

*Primary Examiner* — Karen Tang
(74) *Attorney, Agent, or Firm* — Keller Jolley Preece

(57) ABSTRACT

The present disclosure is directed toward systems and methods for providing electronic advertising content to a client device notwithstanding use of an ad-blocker on the client device. For example, systems and methods described herein involve establishing a peer-to-peer (P2P) connection with a peer device that does not include an ad-blocker thereon. The systems and methods further involve providing an ad request to the peer device to provide to an ad server and subsequently deliver a response to the ad request to the client device via the P2P connection. In this way, the peer device can function as a proxy device for the ad server that enables delivery to the client device notwithstanding use of the ad-blocker on the client device.

16 Claims, 6 Drawing Sheets

FACILITATING PERSONALIZED VIDEO MESSAGES USING PEER-TO-PEER COMMUNICATIONS

CROSS REFERENCE TO RELATED APPLICATIONS

N/A

BACKGROUND

1. Technical Field

One or more embodiments described herein relate generally to communicating electronic content. More specifically, one or more embodiments relate to facilitating delivery of electronic content via a peer-to-peer (P2P) connection.

2. Background and Relevant Art

The Internet is an increasingly popular mechanism for delivering digital advertising content (or simply "advertising content"). For example, a marketer can launch a marketing campaign for a particular product or brand by way of advertising via electronic platforms (websites, emails, native mobile applications, etc.) provided by various publishers. Online marketing is an effective tool for promoting awareness of a particular product or brand and boosting sales.

Many conventional online advertising systems deliver advertising content via audio, video, or other types of media together with Internet content provided via third party providers. Additionally, with increasing digital videos consumed over the Internet, more and more browsers and Internet providers support delivery of targeted advertisements via video delivered in conjunction with video content from third party providers. For example, many conventional systems support delivery of a targeted advertisement by inserting advertising content within or in connection with a video.

With the increased delivery of online advertising content, many devices have implemented ad-blockers that present various challenges when attempting to deliver online advertising content. For example, ad-blockers often prevent delivery of advertising content by preventing communication between a device and an ad server. In particular, ad-blockers often prevent the device from making an ad call or otherwise requesting advertising content to be provided to the device. As such, some conventional systems cannot establish a communication between the device and the ad server.

To discourage use of ad-blockers, many conventional systems prevent functionality of players or software that deliver online content. For example, many conventional systems discourage use of ad-blockers by preventing devices from playing any video, audio, or other media via a browser that detects use of an ad-blocker. Many users, however, experience frustration with third party providers and/or different Internet browsers when basic functionality is interrupted as a result of devices or providers attempting to discourage use of ad-blockers. As a result, many users simply navigate away from certain websites or stop streaming content altogether from various third party providers.

These and other problems exist with regard to delivering advertising content via devices that implement ad-blockers.

SUMMARY

One or more embodiments described herein provide benefits and/or solve one or more of the foregoing and other problems in the art with systems and methods that deliver digital advertising content to client devices having ad-blockers operating thereon. In particular, one or more embodiments described herein involve methods and systems for circumventing ad-blockers. For example, systems and methods described herein establish a peer-to-peer (P2P) connection between a client device having an ad-blocker thereon with a peer device without the ad-blocker. The client device having the ad-blocker then communicates with an ad-server via the peer device without the ad-blocker over the P2P to circumvent the ad-blocker.

The systems and methods described herein employ the P2P connection to circumvent blocked requests to the ad server to enable an ad server to provide advertising content to the client device. In particular, the client device sends an ad request to the peer device over the P2P connection. The peer device then forwards the ad request to an ad server. Upon receiving the response to the ad request from the ad server, the peer device forwards the response to the ad request to the client device with the ad blocker over the P2P connection. In this way, the peer device facilitates delivery of advertising content from an ad server to a client device notwithstanding an ad-blocker operating on the client device.

Additional features and advantages will be set forth in the description which follows, and in part will be obvious from the description, or may be learned by the practice of such exemplary embodiments. The marketing features and advantages of such embodiments may be realized and obtained by means of the instruments and combinations particularly pointed out in the appended claims. These and other marketing features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and marketing features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1:
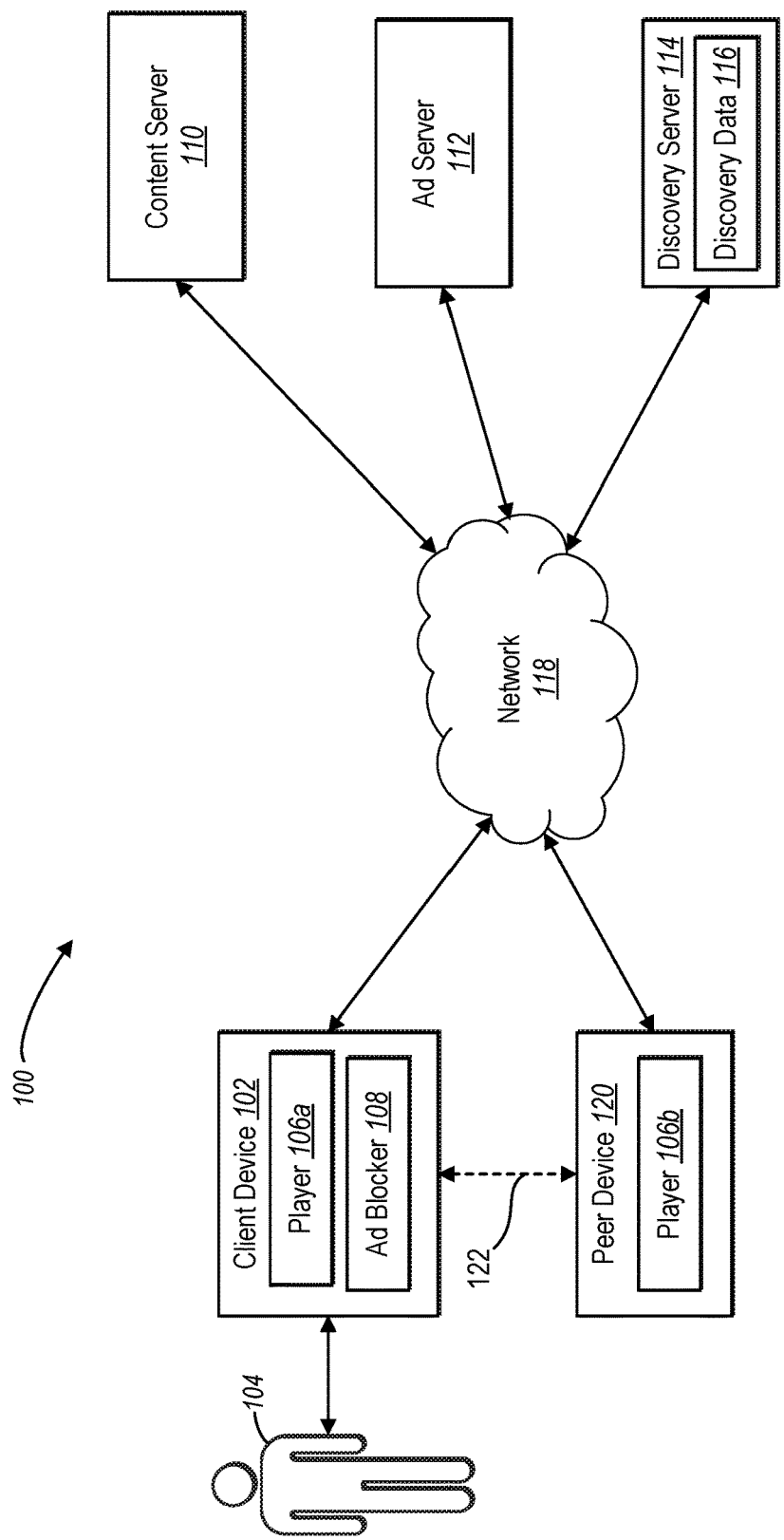
FIG. 1 illustrates a block diagram of an environment in which a peer-to-peer marketing system can operate in accordance with one or more embodiments.

One or more embodiments described herein include a peer-to-peer (P2P) marketing system that facilitates delivery of advertising content to a client device having an ad-blocker installed and operating thereon. In particular, in one or more embodiments, the P2P marketing system facilitates delivery of advertising content to the client device by establishing a P2P connection between the client device and a peer device. Using the P2P connection, the peer device can function as a proxy to allow communication with an ad server that serves or otherwise provides advertising content.

By establishing a P2P connection between the client device and peer device, the P2P marketing system circumvents blocked communications between the ad server and the client device to provide advertising content to a user of the client device. For example, in one or more embodiments, the P2P marketing system establishes a P2P connection between a client device having an ad-blocker thereon and a peer device that does not utilize an ad-blocker. Upon establishing the P2P connection, the client device can provide an ad request to the peer device, which forwards or otherwise communicates the ad request to the ad server. Further, the peer device can receive a response (e.g., advertising content or a link thereto) and deliver the response to the client device.

Additionally, the P2P marketing system utilizes the P2P connection between the client device and the peer device to deliver advertising content to the client device without interrupting functionality of an Internet browser or other software operating on the client device. For example, in one or more embodiments, upon detecting that an ad-blocker has blocked a communication from the client device to the ad server, the client device queries other devices (e.g., nearby devices) to identify a peer device without an active ad-blocker. Upon establishing a P2P connection with the peer device, the client device can provide an ad request to the peer device that the peer device relays or otherwise provides to the ad server.

In addition to providing the ad request to the ad server, the peer device can further receive advertising content in response to the ad request on behalf of the client device. Once received, the peer device delivers the advertising content to the client device. For example, in one or more embodiments, the peer device provides the advertising content to the client device over the P2P connection. Thus, the P2P marketing system enables a peer device without an ad-blocker to request and receive advertising content on behalf of a client device using an ad-blocker and further deliver the advertising content intended for the client device over the P2P connection established between the client device and the peer device.

In addition to using the peer device to request and provide advertising content for a client device having an ad-blocker, the P2P marketing system can further provide ad tracking information to an ad server on behalf of the client device. For example, after receiving the advertising content via the P2P connection, the client device makes an ad tracking call to the ad server to provide information associated with the advertising content provided to the client device. Similar to the advertisement call, the ad-blocker can block a communication to the ad server that includes the tracking call. Using the P2P connection or re-establishing the P2P connection between the client device and the peer device, the client device can provide the ad tracking call to the peer device to forward or otherwise provide the ad tracking call to the ad server.

Thus, one or more embodiments overcome the technical hurdle of providing advertising content to client devices with an ad blocker. In particular, by establishing a peer-to-peer connection, a client device with an ad-blocker that prevents the sending of communications over a network to ad servers nonetheless is able to send and receive communications from an ad server. In other words, upon detecting that a communication over a first type of network (e.g., the Internet) to an ad server has been blocked or otherwise prevented, the client device sends the communication over a second type of network (e.g., a peer-to-peer connection) to the ad server via a proxy device (e.g., peer device). By so doing, one or more embodiments helps ensure that advertising content, and in particular targeted advertising content, is received and delivered despite the presence of an ad blocker. One will appreciate that the ability to provide advertising content helps ensure that content (e.g., native client applications, movies, television, streaming sports, and other online content) is available for free or at a discounted rate. Without the ability to provide advertising many content providers would not have the financial incentive to produce and provide their content.

FIG. 1 illustrates a schematic diagram of a P2P marketing system 100 (or simply "system 100") in which advertising content is delivered to an end-user notwithstanding use of an ad-blocker on one or more devices. As show in FIG. 1, the system includes a client device 102 associated with a user 104 including a player 106a and ad-blocker 108 thereon. The system 100 further includes a content server 110, ad server 112, and discovery server 114 including discovery data 116. The system 100 further includes a network 118. Additionally, as shown in FIG. 1, the system 100 includes a peer device 120 having a player 106b thereon. The system 100 further includes a peer-to-peer connection 122 (or simply "P2P connection 122") between the client device 102 and the peer device 120.

As shown in FIG. 1, each of the content server 110, ad server 112, and discovery server 114 can communicate with the client device 102 and peer device 120 over the network 118. In one or more embodiments, the network 118 includes a wireless communications network (e.g., Internet) over which data is transmitted between the client device 102, content server 110, ad server 112, discovery server 114, and/or peer device 120. The network 118 may include other types of networks that use various communication technology and protocols, such as a corporate intranet, a virtual private network (VPN), a local area network (LAN), a wireless local network (WLAN), a cellular network, a wide area network (WAN), a metropolitan area network (MAN), near field communication network, or a combination of two or more such networks. Additional networks and network features are described below in connection with FIG. 5. Additionally, while FIG. 1 illustrates one example embodiment in which each of the client device 102, content server 110, ad server 112, discovery server 114, and peer device 120 communicate over the network 118, it will be appreciated that one or more embodiments of the system 100 include one or more different networks and/or direct connections between different devices.

Additionally, while FIG. 1 illustrates a system 100 including one client device 102 and one peer device 120, it is appreciated that the system 100 can include one or more additional client devices and/or peer devices. Additionally, as used herein, the client device 102 can refer to any electronic device (e.g., user device) that includes an active ad-blocker operating thereon. Further, as used herein, the peer device 120 can refer to any electronic device (e.g., similar to the client device 102) that does not include an active ad-blocker operating thereon. For example, in at least one embodiment, the client device 102 refers to an electronic device with similar capabilities as the peer device 120 with the exception of an ad-blocker 120 running on the client device 102 and not on the peer device 120. Alternatively, the client device 102 and peer device 120 refers to different types of electronic devices where the client device 102 includes an active ad-blocker 108 while the peer device 120 does not.

Moreover, it is appreciated that an electronic device can include an ad-blocker that is inactive or operates with respect to a limited selection of browsers or applications. As an example, in one or more embodiments, an electronic device can include an ad-blocker that prevents the electronic device from serving advertising content when using a first Internet browser, but does not prevent delivery of advertising content when using a second Internet browser. When the electronic device provides media content using the first Internet browser, the electronic device can function similar to the client device 102 including the ad-blocker 108 thereon. Alternatively, where the electronic device provides media content using the second Internet browser, the electronic device can function similar to the peer device 120 that does not include the ad-blocker 108 thereon.

As shown in FIG. 1, the system 100 includes a single client device 102 and single peer device 120. It is appreciated, however, that the system 100 can include any number of client devices having ad-blockers thereon and any number of peer devices without ad-blockers. Examples of client devices and peer devices can include, but are not limited to, mobile devices (e.g., smartphones, tablets, smart watches), laptops, desktops, or other type of computing device, such as those described below in connection with FIG. 5.

Additionally, while FIG. 1 illustrates a system 100 including a separate content server 110, ad server 112, and discovery server 114, it is appreciated that the different servers 110-114 may be implemented on the same or separate server devices. For example, in one or more embodiments, the ad server 112 and discovery server 114 reside on a single server device (or system of server devices associated with a single entity) while the content server 110 resides on a separate server device (e.g., associated with a third party publisher). Further, in one or more embodiments, the system 100 includes multiple content servers associated with respective content providers that cooperate with the ad server 112 to provide advertising content in conjunction with media content to one or more client devices.

As mentioned above, the system 100 enables a client device 102 to provide media content and advertising content to a user 104 notwithstanding use of an ad-blocker 108 operating on the client device 102. As used herein, "media content" or "digital media" refers to any consumable digital content provided to a user of a client device. For example, media content can refer to digital video, digital audio, digital photos, streaming content, or other digital content provided to a user. In one or more embodiments, media content refers to digital content provided over the Internet by a content publisher. Examples of content publishers include a user, organization, or entity that provides a website, television channel, radio channel, or other communication channel over which digital media is provided to the user. In one or more embodiments, media content is provided via a media player or other application that runs on a client device.

As used herein, "advertising content," "advertising content" or "marketing content" refers to digital advertisements or other forms of digital data related to marketing that may be transmitted over a communications network. For example, digital advertising content can include, but is not limited to, digital media (e.g., audio, video, images), electronic messages, electronic advertisements, or any other digital data or combination of digital data. To illustrate, in one or more embodiments, marketing content or advertising content refers to a video advertisement provided to a user via a website. In one or more embodiments, advertising content refers to over the top (OTT) advertising content delivered over the Internet in conjunction with content provided via a third party provider. For example, advertising content can refer to video content provided over the top or together with a streaming video from a third-party content provider.

As used herein, an "ad-blocker" refers to hardware, software, or other tool utilized by a computing device to prevent delivery of advertising content to a client device. For example, an ad-blocker may refer to a plug-in or application program interface (API) that runs in conjunction with an Internet browser and prevents the browser, a player, or other program from receiving advertising content from an ad server. In one or more embodiments, an ad-blocker prevents delivery of advertising content to a client device by blocking one or more communications between a client device and an ad server. For example, an ad blocker can prevent a client device from sending an ad request or other information to an ad server, thus, preventing the ad server from returning advertising content.

Additionally, as mentioned above, in one or more embodiments, the client device 102 provides video content and video advertisements to the user 104 via a player 106a that operates on the client device 102. For example, in one or more embodiments, the player 106a is a Javascript based HTML5 video player that provides video content via a graphical user interface on the client device 102. In particular, the player 106a can provide streaming video in HTTP live streaming (HLS) and/or dynamic adaptive streaming over HTTP (DASH) formats. In one or more embodiments, the player 106a runs in a browser window in compliance with the World Wide Web Consortium (W3C) Media Source Extension (MSE) specifications. The player 106a further includes client side ad-insertion capabilities that enables the player 106a to provide personalized or otherwise targeted advertisements to the user 104. It is appreciated that the player 106b on the peer device 120 can include similar features and functionality as the player 106a on the client device 102. For example, in one or more embodiments, both of the players 106a-b downloaded from the same source.

Prior to delivering media content to the user 104, one or more embodiments of the discovery server 114 collects discovery data 116 associated with various devices having the player 106 installed or running thereon. For example, the players 106a-b can provide information associated with the client device 102 and peer device 120 including device specifications, previous or current video streams played on the client device 102, and whether or not an ad-blocker 108 is present on the client device 102 or peer device 120. For example, as part of the installation of the players 106a-b on the client device 102 and peer device 120, the discovery server 114 can collect any discovery data 116 helpful for displaying media content and/or advertising content on the client device 102 or peer device 120. Alternatively, in one or more embodiments, the discovery server 114 receives (e.g., from the player 106*a*) an identification of an ad-blocker 108 on the client device 102 upon detecting use of the ad-blocker 108.

In addition to generally identifying that an ad-blocker 108 exists or operates under various circumstances, the discovery server 114 can identify specific browsers or uniform resource locators (URLs) or specific websites for which the ad-blocker 108 is applicable. For example, where the ad-blocker 108 only operates in conjunction with a particular Internet browser or for rejecting advertising content from a particular URL, the discovery data 116 includes information identifying the browser or URL for which the ad-blocker 108 applies. Alternatively, where the client device 102 includes an ad-blocker 108, but that the ad-blocker 108 is not applicable to a particular Internet browser or for blocking advertising content from a particular URL, the discovery data 116 includes an identification of the browser for which the ad-blocker 108 does not apply. As such, in one or more embodiments, the discovery server 114 identifies the client device 102 as an ad-blocking device for some browsers or URLs while identifying the client device 102 as a non-ad-blocking device (e.g., peer device 120) for other browsers or URLs.

As mentioned above, the content server 110 delivers media content to the client device 102. For example, in one or more embodiments, the client device 102 receives video content from the content server 110. Upon receipt of the video content, the player 106 provides (e.g., displays, streams) the video content to the user 104 via a display on the client device 102. For example, in one or more embodiments, the player 106 streams the video content within a web browser on the client device 102.

In addition to receiving the media content from the content server 110, the client device 102 receives advertisement metadata including information for requesting an advertisement from an ad server 112. For example, the client device 102 can receive information associated with a type of advertisement, length of advertisement, a location (e.g., URL) of the advertisement, and other information to send to an ad server 112 to request advertising content. For instance, the client device 102 can receive information to create an Asynchronous JavaScript and XML (AJAX) request for advertising content. In one or more embodiments, the request includes information about the client device 102 or the user that allows for a personalized or target advertisement.

In accordance with the advertisement metadata, the player 106 generates an ad request to send to the ad server 112. However, upon generating the ad request, the ad-blocker 108 on the client device 102 can block transmittal of the ad request to the ad server 112. For example, in response to detecting that the player 106 has initiated an ad request, the ad-blocker 108 blocks transmittal of the ad request and returns an error signal to a callback handler of the ad request. As a result, the player 106 does not receive an ad response and the player 106 identifies that the client device 102 is unable to send the ad request to the ad server 112.

In response to the ad-blocker 108 blocking the ad request, the player 106 establishes a P2P connection 122 between the client device 102 and the peer device 120 that does not include an active ad-blocker 108. As will be described in greater detail below, the player 106 can query the discovery server 114 to receive discovery data 116 including information for discovering or otherwise identifying the peer device 120 or other device without an ad-blocker 108. Upon receiving the discovery data 116, the player 106 on the client device 102 identifies the peer device 120 and establishes the P2P connection 122 between the client device 102 and peer device 120.

Upon establishing the P2P connection 122, the client device 102 provides the ad request to the peer device 120 to provide to the ad server 112 on behalf of the client device 102. In one or more embodiments, the peer device 120 receives the ad metadata and other parameter information associated with the client device 102 for the player 106 on the peer device 120 to generate an ad request on behalf of the client device 102. Alternatively, in one or more embodiments, the peer device 120 simply forwards the ad request generated by the player 106 on the client device 102 to the ad server 112.

In response to the ad request received from the peer device 120, the ad server 112 provides a response to the ad request intended for the client device 102 (or user 104 of the client device 102) based on the information about the client device 102 or user included in the ad request. The ad server 112 provides the response to the peer device 120, which provides the response to the client device 102. In one or more embodiments, the peer device 120 provides the response by serving advertising content via the player 106*a* of the client device 102. Alternatively, in one or more embodiments, the peer device 120 provides the ad response including information for the player 106*a* to present advertising content to the user 104.

In addition to enabling the client device 102 to provide advertising content to the user 104 of the client device 102, the system 100 further enables the client device 102 to generate a tracking call or otherwise provide tracking information to the ad server 112. For example, the player 106*a* can detect or otherwise track user interactions or other information associated with providing an advertisement to the user 104 and generate a tracking call for the ad server 112 including the tracking information. Similar to the ad request, however, the ad-blocker 108 can block the tracking call to the ad server 112 from the client device 102.

In response to detecting the tracking call (or detecting that the tracking call has been blocked), the client device 102 can utilize the P2P connection with the peer device 120 to provide the tracking call to the peer device 120 for delivery to the ad server 112. In one or more embodiments, the client device 102 utilizes the same P2P connection 122 previously established for relaying the ad request. Alternatively, in one or more embodiments, the player 106*a* re-establishes the P2P connection 122 or establishes a new P2P connection 122 to deliver the tracking call to the ad server 112.

In one or more embodiments, the client device 102 provides the tracking call to the ad server 112 via the same peer device 120 as used for providing the ad request. Alternatively, in one or more embodiments, the client device 102 provides the tracking call to the ad server 112 using a different peer device (e.g., other electronic device without an active ad-blocker). For example, where the peer device 120 is nearby the client device 102 when generating the ad request, the client device 102 and/or peer device 120 may move out of range in between implementing the ad request and generating the tracking call. As such, the client device 102 can request and use discovery data 116 to discover a different peer device that is nearby the client device 102 and establish a new P2P connection between the client device 102 and the different peer device. Using this new P2P connection, the client device 102 can generate and deliver the tracking call to the ad server 112 via the different peer device.

Figure 2A:
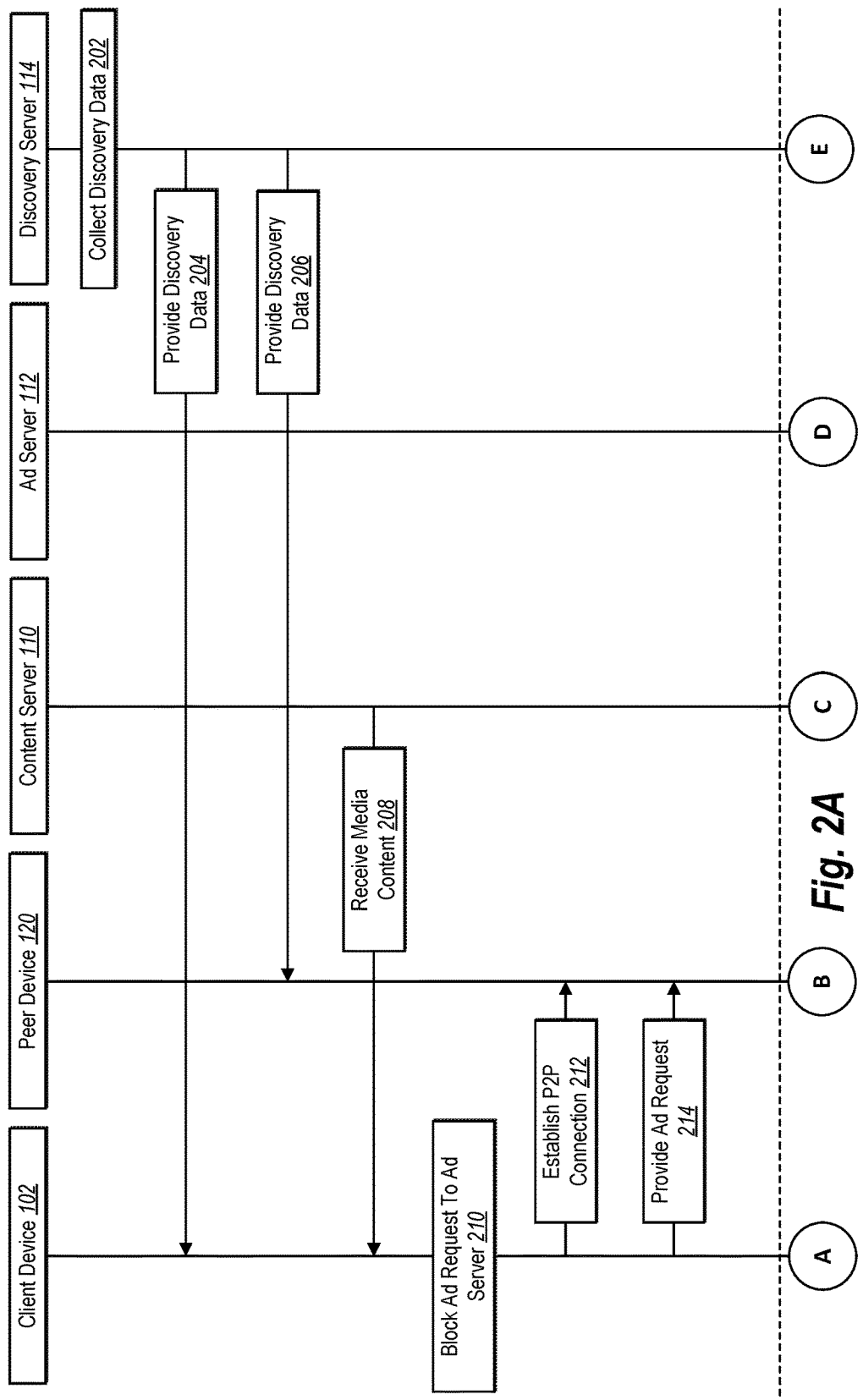
FIGS. 2A-2B illustrates a sequence diagram of interactions between devices of the peer-to-peer marketing system of FIG. 1 in accordance with one or more embodiments.
Figure 2B:
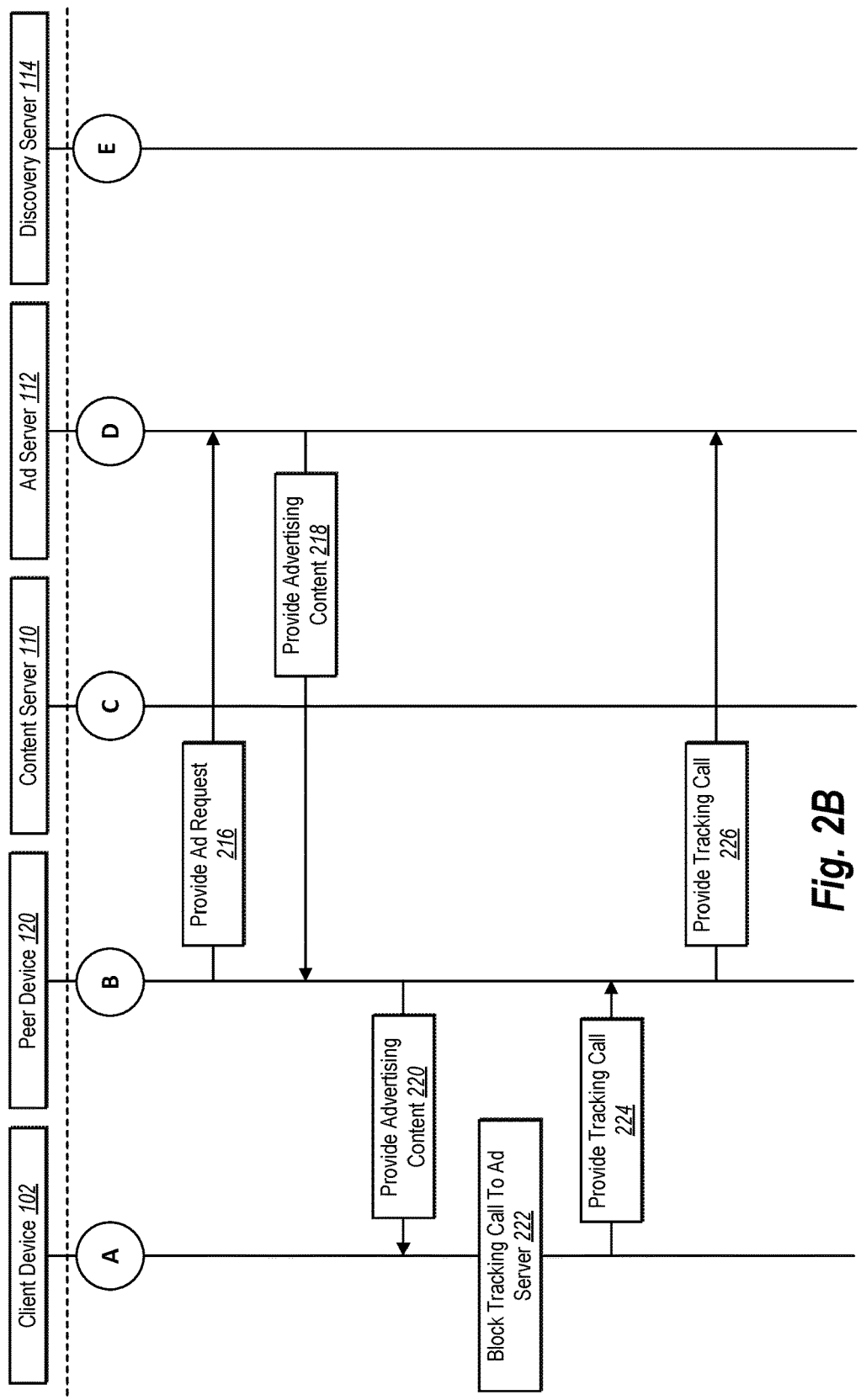

FIGS. 2A-2B illustrate a sequence diagram of interactions between a client device 102, peer device 120, content server 110, ad server 112, and discovery server 114. In particular, FIGS. 2A-2B illustrate one example embodiment for requesting and delivering advertising content to a client device 102 that utilizes an ad-blocker 108. Additionally, FIGS. 2A-2B illustrate interactions for generating and providing a tracking call from the client device 102 utilizing the ad-blocker 108.

As illustrated in FIG. 2A, the discovery server 114 collects 202 discovery data 116. In particular, the discovery server 114 can request, receive, or otherwise obtain information associated with users and user devices (e.g., client devices and peer devices) having the player 106 installed or otherwise operating thereon. For example, upon installing a player 106a on the client device 102, the client device 102 provides discovery data 116 to the discovery server 114 including information about the client device 102 such as specification information, a history of viewed content (e.g., media content, advertising content), and user information, and information associated with one or more ad-blockers.

For example, the discovery server 114 collects discovery data 116 for one or more electronic devices including an identification of whether an ad-blocker is present or absent from the electronic device. Additionally, the discovery server 114 can collect discovery data 116 including information associated with the ad-blocker including an identification of Internet browsers, applications, URLs, or content providers for which the ad-blocker is active or otherwise operational. For example, the discovery server 114 collects discovery data 116 including an identification of one or more browsers for which an ad-blocker will block requests for or delivery of advertising content. Additionally, the discovery server 114 collects discovery data 116 including an indication of one or more browsers for which the ad-blocker does not prevent requests for or delivery of advertising content.

Additionally, in one or more embodiments, the discovery server 114 collects discovery data including information for establishing a P2P connection 122 between devices. For example, upon installation of the players 106a-b on the client device 102 and peer device 120, the discovery server 114 collects information associated with each player 106a-b and associated device to enable the client device 102 and/or peer device 120 to establish the P2P connection 122. For instance, the discovery server collects discovery data 116 including information to facilitate discovery of one or more nearby devices that have a player installed or operating thereon. Additionally, the discovery server 114 collects discovery data 116 including information to establish the P2P connection 122 over which ad requests, ad responses, and/or tracking calls can be transmitted. For example, the discovery data 116 can include information to enable the peer device 120 to stream advertising content to the client device 102 over the P2P connection 122.

As shown in FIG. 2A, the discovery server 114 provides 204 discovery data 116 to the client device 102. As further shown in FIG. 2A, the discovery server 114 provides 206 the discovery data 116 to the peer device 120. In one or more embodiments, the discovery server 114 provides discovery data 116 to the client device 102 and peer device 120 upon installation of the players 106a-b on the respective devices. Alternatively, in one or more embodiments, the discovery server 114 periodically provides discovery data 116 including information about nearby devices and whether one or more of the nearby devices have an active ad-blocker. In one or more embodiments, the discovery server 114 provides discovery data 116 upon request from the client device 102 and/or peer device 120. For example, the discovery server 114 provides discovery data 116 in response to a query from the client device 102 and/or peer device 120 attempting to establish a P2P connection 122.

As shown in FIG. 2A, the client device 102 receives 208 media content from the content server 110. For example, the client device 102 streams video content provided by the content server 110 to the user 104 via the player 106a on the client device 102. In one or more embodiments, the client device 102 receives the media content and provides the media content via a web browser in which the player 106a operates. Alternatively, the client device 102 streams the media content via a native software application rather than a web browser.

In addition to providing media content, the content server 110 further provides ad metadata including information for requesting advertising content from the ad server 112. In one or more embodiments, the content server 110 provides the ad metadata in-band with the media content. Alternatively, in one or more embodiments, the content server 110 provides the ad metadata out-of-band of the media content. In one or more embodiments, the ad metadata includes one or more URLs, HTTP headers, cookies, and other information to include in an ad call to facilitate retrieval of advertising content to provide to the client device 102.

In one or more embodiments, the client device 102 generates an ad request to provide to the ad server 112. For example, the player 106a can generate an ad request using information associated with the client device 102, the user 104, and ad metadata received from the content server 110. For example, based on the ad metadata and additional information, the player 106a can generate an AJAX call for the client device 102 to send to the ad server 112. Upon generating the ad request, the player 106a can cause the client device 102 to send (or attempt to send) the ad request to the ad server 112.

As shown in FIG. 2A, however, an ad-blocker 108 on the client device 102 can block 210 the ad request to the ad server. For example, in one or more embodiments, the ad-blocker 108 prevents any outbound communications from the client device 102 to the ad server 112. In particular, upon attempt of the client device 102 to send the ad request, the ad-blocker 108 can generate an error message to the player 106a indicating a failure to send the ad request to the ad server 112.

Upon detecting that the ad-blocker 108 has blocked the ad request to the ad server 112, the client device 102 can establish 212 a P2P connection 122 between the client device 102 and the peer device 120. In particular, in one or more embodiments, the client device 102 queries the discovery server 114 for discovery information associated with one or more devices eligible or available to communicate via a P2P connection 122. For example, the client device 102 queries the discovery server 114 to receive discovery data 116 including information about nearby devices and whether one or more of the nearby devices have an active ad-blocker. For example, the client device 102 requests information about whether ad-blockers exist on nearby devices and/or whether an ad-blocker will prevent communications with the ad-server 112.

In one or more embodiments, the client device 102 identifies the peer device 120 as a nearby device available to establish a P2P connection 122 with the client device 102. For example, based on the discovery data 116, the client device 102 identifies the peer device 120 as a device not presently utilizing an ad-blocker and capable of communicating with the ad server 112. Additionally, based on the discovery data 116, the client device 102 can identify the peer device 120 as a device having a player 106*b* thereon and capable of generating, packaging, and/or simply forwarding the ad request to the ad server 112. Additionally, the client device 102 can identify the peer device 120 as capable of providing or serving an ad request response or the advertising content itself to the client device 102.

As mentioned above, once the client device 102 identifies an eligible peer device 120, the client device 102 establishes 212 a P2P connection 122 between the client device 102 and peer device 120. In one or more embodiments, the P2P connection 122 includes a separate connection or network other than the network 118 connecting the client device 102 from the content server 110, ad server 112, and/or discovery server 114. For example, the client device 102 establishes a direct connection between the client device 102 and the peer device 120. Alternatively, in one or more embodiments, the client device 102 establishes a connection between the client device 102 and the peer device 120 over a local network.

As shown in FIG. 2A, upon establishing the P2P connection 122, the client device 102 provides the ad request 214 to the peer device 120 to provide to the ad server 112 on behalf of the client device 102. As described above, the ad request can include ad metadata provided from the content server 110 as well as parameter information including information associated with the client device 102 and/or user 104. For example, the player 106*a* can include Hypertext Transfer Protocol (HTTP) headers, cookies, user profile information and other parameter information that may be used to generate targeted advertising content particular for the client device 102 and/or user 104. In one or more embodiments, the parameter information is obtained from the ad metadata received from the content server 110. Alternatively, the player 106*a* can generate parameter information from other data accessible to the client device 102 (e.g., discovery data 116).

In one or more embodiments, the client device 102 provides the generated ad request for the peer device 120 to simply forward to the ad server 112. For example, the player 106*a* on the client device 102 generates the ad request and provides the generated ad request to the peer device 120 to send to the ad server 112 without modifying the ad request. Alternatively, in one or more embodiments, the client device 102 provides ad metadata, parameter information, and other information for the player 106*b* on the peer device 120 to generate the ad request and send to the ad server 112 on behalf of the client device 102.

Moving onto FIG. 2B, the peer device 120 sends the ad request to the ad server 112 on behalf of the client device 102. Upon receiving the ad request, the ad server 112 identifies advertising content to provide to the peer device 120. In particular, in response to the ad request, the ad server 112 can generate an ad response based on the parameter information and ad metadata including a selection of advertising content to be provided to the user 104. As shown in FIG. 2B, the ad server provides 218 the advertising content to the peer device 120. As mentioned above, the advertising content can include content (e.g., video content) targeted to the user 104 of the client device 102 based on the ad metadata and/or parameter information associated with the user 104 and/or client device 102. Alternatively, rather than providing the advertising content, the ad server 112 can provide an ad request response that includes information of how to obtain the advertising content, such as, for example, a URL from which the advertising content can be downloaded or streamed.

It will be appreciated in light of the disclosure herein that the ad server 112 receives the ad request and provides the ad response without consideration of the specific device providing the ad request and receiving the ad response. For example, in one or more embodiments, the ad server 112 is unaware of the relationship of the ad request and the peer device 120 providing the ad request. In particular, while the ad request includes information associated with the client device 102 and/or media content received at the client device 102, the ad server 112 need not distinguish between the client device 102 and the peer device 120 when generating the ad response. As such, the ad server 112 need not consider the identity of the device providing the ad request, rather, in one or more embodiments, the ad server 112 generates an ad response based on the information provided to the ad server 112 without consideration of the device (e.g., peer device 120) providing the ad request.

As shown in FIG. 2B, upon receiving the advertising content from the ad server 112, the peer device 120 functions as a proxy for the ad server 112 and provides 220 the advertising content or an ad response to the client device 102. For example, the peer device 120 provides the advertising content to the client device 102 over the P2P connection 122 previously established between the client device 102 and the peer device 120. In one or more embodiments, the peer device 120 provides the ad response including any information needed for the player 106*a* on the client device 102 to locally generate the advertising content on the client device 102. Alternatively, in one or more embodiments, the peer device 120 serves or streams the advertising content (e.g., video advertisement) to the client device 102 over the P2P connection 122 to be displayed via the player 106*a* on the client device 102.

In one or more embodiments, upon displaying the advertising content to the user 104 of the client device 102, the client device 102 may attempt to make a tracking call to the ad server 112 including tracking information associated with the advertising content. For example, the player 106*a* can track whether the user 104 clicked on the advertisement, viewed the entire advertisement, navigated to a URL provided in the advertisement, or other information associated with providing the advertisement to the user 104. In one or more embodiments, the player 106*a* generates the tracking information and prepares a tracking call including the tracking information to send to the ad server 112. Similar to the ad call described above, the client device 102 may attempt to send the tracking call to the ad server 112.

Similar to the ad call, however, the ad-blocker 108 can block 222 the tracking call to the ad server 112. For example, similar to one or more embodiments described herein, the ad-blocker 108 prevents any communication to the ad server 112. Additionally, in response to blocking the tracking call, the ad-blocker 108 can generate an error signal or message for the player 106*a* indicating that the tracking call was not provided to the ad server 112.

In response to detecting that the ad-blocker 108 blocked the tracking call, the client device 102 provides 224 the tracking call to the peer device 120. For example, the client device 102 provides the tracking information and any parameter information to identify the client device 102 and/or user 104 to provide to the ad server 112. Additionally, as shown in FIG. 2B, the peer device 120 provides 226 the tracking call to the ad server 112 on behalf of the client device 102.

In one or more embodiments, the client device 102 provides the tracking call to the peer device 120 using the same P2P connection 122 between the client device 102 and the same peer device 120. Alternatively, in one or more embodiments, the client device 102 establishes a new P2P connection 122 between the client device 102 and the peer device 120. For example, rather than maintain the P2P connection 122 over the duration that the advertising content is displayed on the client device 102, the client device 102 stops or cuts off the P2P connection 122 between devices and re-establishes the P2P connection 122 after the advertising content/response is provided to the client device 102 and after tracking one or more interaction of the user 104 with the advertising content.

Additionally, in one or more embodiments, the client device 102 communicates with the ad server 112 using a different device than the peer device 120 used for providing the ad request to the ad server 112 and receiving the ad response. For example, where a period of time has passed between displaying the advertising content and generating the tracking call, the peer device 120 may have moved out of range or implemented an ad-blocker thereon. For example, the discovery data 116 indicates that the peer device 120 is no longer an eligible device to serve as a proxy for the ad server 112 because the peer device 120 is out of range or the discovery server 114 detects that the peer device 120 has installed an ad-blocker. Thus, in response to detecting that the tracking call has been blocked by the ad-blocker 108, the client device 102 can query the discovery server 114 for additional discovery data 116 including an identification of one or more different devices without an active ad-blocker and capable to receive and forward the tracking call to the ad server 112.

Figure 3:
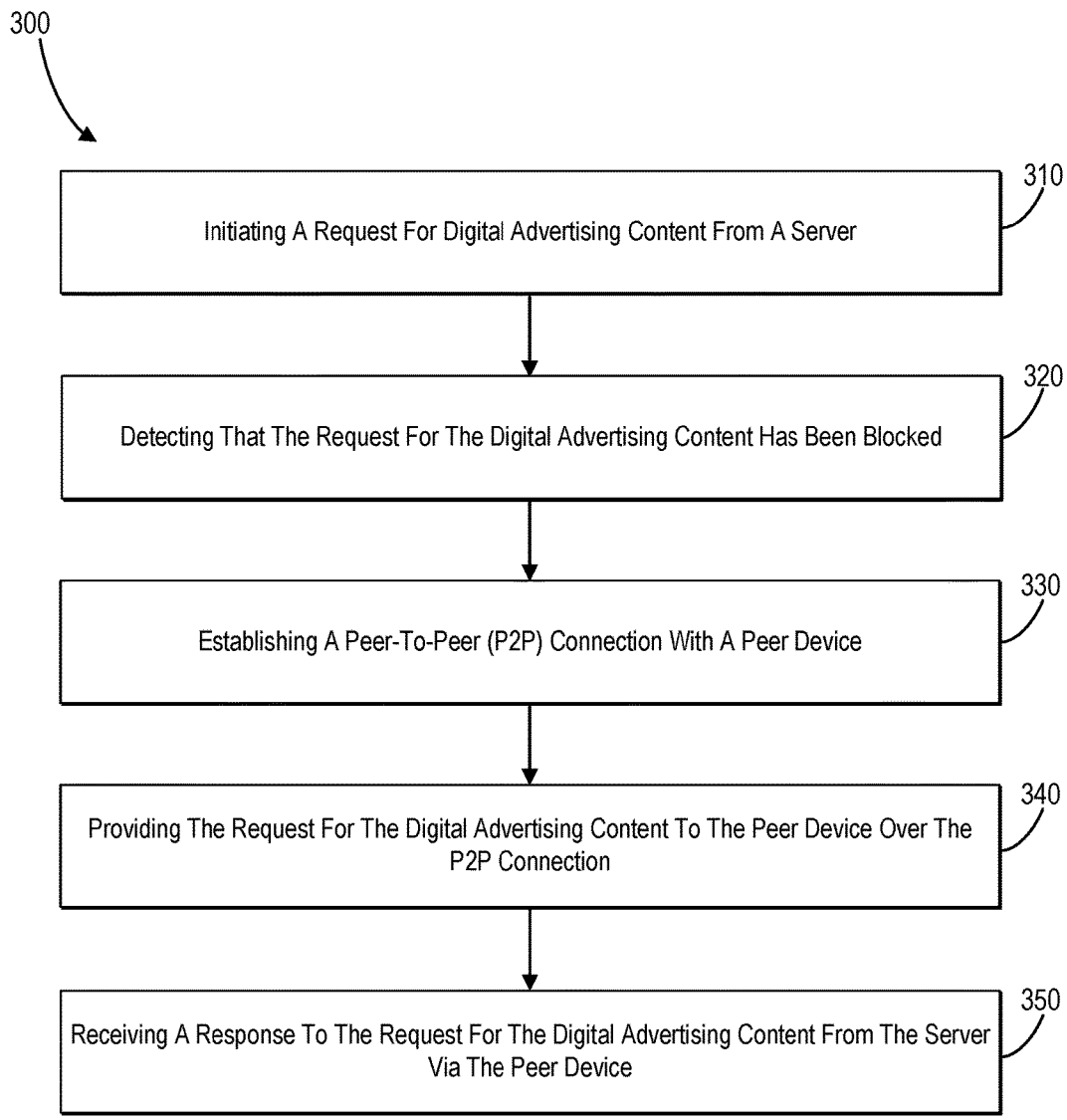
FIG. 3 illustrates a flow chart of a series of acts in a method of delivering advertising content to a client device having an ad-blocker thereon in accordance with one or more embodiments.
Figure 4:
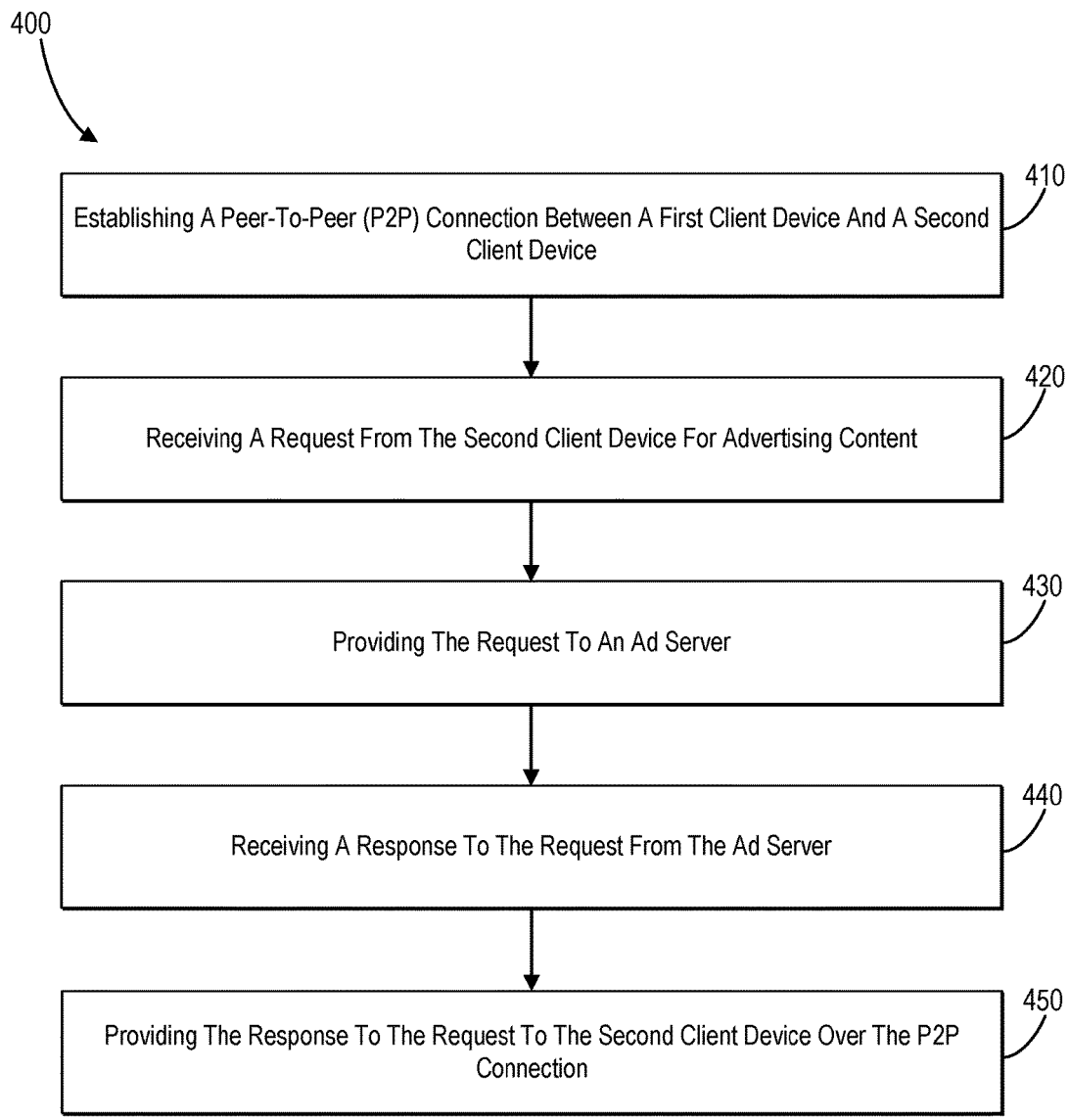
FIG. 4 illustrates a flow chart of a series of acts in a method of delivering advertising content to a client device having an ad-blocker thereon in accordance with one or more embodiments.

FIGS. 1-2B, the corresponding text, and the examples, provide a number of different systems and devices for serving digital advertisements over a network notwithstanding use of an ad-blocker 108 on a client device 102. In addition to the foregoing, one or more embodiments can also be described in terms of flowcharts comprising acts and steps in a method for accomplishing a particular result. For example, FIGS. 3 and 4 illustrate flowcharts of exemplary methods in accordance with one or more embodiments. The methods described in relation to FIGS. 3 and 4 may be performed with less or more steps/acts or the steps/acts may be performed in differing orders. Additionally, the steps/acts described herein may be repeated or performed in parallel with one another or in parallel with different instances of the same or similar steps/acts.

FIG. 3 illustrates a flowchart of one example method 300 for preventing ad-blockers from blocking advertising content to a client device 102. The method 300 includes an act 310 of initiating a request for digital advertising content from a server. For example, in one or more embodiments, the act 310 involves initiating, by a client device 102, a request for digital advertising content from a server (e.g., ad server 112). In one or more embodiments, initiating the request involves generating the request based on advertisement metadata and/or parameter information associated with the client device 102.

For example, in one or more embodiments, the method 300 includes receiving, by the client device 102, content (e.g., video content) from a content server 110. Additionally, in one or more embodiments, receiving the content involves receiving advertisement metadata in conjunction with the received content. In one or more embodiments, the content includes a video playable within a web browser on the client device. Additionally, in one or more embodiments, receiving the content involves receiving Hypertext Transfer Protocol (HTTP) headers, cookies, and/or a URL receives via a video stream provided to the client device 102 by the content server 110.

As shown in FIG. 3, the method 300 includes an act 320 of detecting that the request for the digital advertising content has been blocked. For example, in one or more embodiments, the method 300 involves blocking the request for digital advertising content from the server (e.g., ad server 112) using an ad-blocker 108 operating on the client device 102. In one or more embodiments, detecting the request for the digital advertising content has been blocked involves identifying an error response from the ad-blocker 108 to an attempt to send the request for digital advertising content to the ad server 112.

As shown in FIG. 3, the method 300 includes an act 330 of establishing a peer-to-peer (P2P) connection 122 with a peer device 120. For example, in one or more embodiments, the act 330 involves establishing a P2P connection 122 with the peer device 122 in response to detecting that the request for the digital advertising content has been blocked (e.g., by the ad-blocker 108). In one or more embodiments, establishing the P2P connection is facilitated by discovery data 116 collected by and provided via a discovery server 114. For example, in one or more embodiments, the discovery server 114 collects discovery data 116 associated with the client device 102, peer device 120 and any number of devices including information that may be used to establish the P2P connection 122. For example, as described above, the discovery data 116 can include information associated with the presence or absence of an ad-blocker on any number of devices and the eligibility of the devices to function as a peer device 120.

Thus, in one or more embodiments, establishing the P2P connection 122 involves providing a request for discovery data 116 to a discover server 114 including information associated with a plurality of nearby devices. In one or more embodiments, the discovery data 116 involves an identification of each of the plurality of nearby devices having an active ad-blocker. Additionally, in one or more embodiments, establishing the P2P connection 122 involves identifying the peer device 120 from one or more of the plurality of nearby devices that do not have an active ad-blocker.

As further shown in FIG. 3, the method 300 includes an act 340 of providing the request for the digital advertising content to the peer device 120 over the P2P connection 122. For example, in one or more embodiments, the act 340 involves providing, to the peer device 120 over the P2P connection 122, the request for the digital advertising content. In one or more embodiments, providing the request for the digital advertising content involves providing parameter information associated with the client device 102 to the peer device 120. In one or more embodiments, the parameter information includes HTTP headers, cookies, and/or at least one URL receives via a video stream provided to the client device 102 by the content server 110. Additionally, in one or more embodiments, providing the request for the digital advertising content involves providing the ad metadata received from the content server 110 to the peer device 120 (e.g., over the P2P connection 122).

As shown in FIG. 3, the method 300 includes an act 350 of receiving a response to the request for the digital advertising content from the server (e.g., ad server 110) via the peer device 120. For example, in one or more embodiments, the act 350 involves receiving, from the peer device 120, a response generated by the server (e.g., ad server 112) to the request for the digital advertising content. In one or more embodiments, receiving the response involves streaming digital advertising content from the peer device 120. Additionally, in one or more embodiments, receiving the response generated by the ad server 112 involves receiving targeted advertising content selected by the ad server 112 based on the parameter information associated with the client device 102. Still further, receiving the response generated by the ad server 112 involves receiving a URL or other indication of a location from which advertising content may be obtained.

Moreover, in one or more embodiments, the method 300 involves detecting that a tracking call has been blocked (e.g., by the ad-blocker 108). In response, the method 300 can include providing, the peer device 120 over the P2P connection 122, a request to provide the tracking call to the ad server 112. In one or more embodiments, the method includes providing the request to provide the tracking call to the ad server 112 over the same P2P connection 122 and to the same peer device 120 as the peer device 120 that received and implemented the request for digital advertisement content.

Alternatively, in one or more embodiments, the method 300 includes detecting that a tracking call has been blocked and establishing a second P2P connection with a second peer device. For example, the method 300 can include establishing the second P2P connection upon determining that the peer device 120 has moved out of range from the client device 102 or that the peer device 120 has installed or currently has an active ad-blocker thereon. In one or more embodiments, the method 300 includes include providing, to the second peer device over the second P2P connection, a request to provide the tracking call to the ad server 112.

FIG. 4 illustrates a flowchart of one example method 400 for preventing ad-blockers from blocking advertising content to a client device 102. As shown in FIG. 4, the method 400 includes an act 410 of establishing a peer-to-peer (P2P) connection 120 between a first client device (e.g., peer device 120) and a second client device (e.g., client device 102). For example, in one or more embodiments, the act 410 involves establishing, by a first client device, a P2P connection with a second client device. In one or more embodiments, establishing the P2P connection involves establishing the P2P connection in response to identifying that the second client device (e.g., client device 102) has utilized an ad-blocker 108 to block a request to an ad server 112 for digital advertising content.

As shown in FIG. 4, the method 400 includes an act 420 of receiving a request from the second client device (e.g., client device 102) for digital advertising content. For example, in one or more embodiments, the act 420 involves receiving, from the second client device over the P2P connection 122, a request for advertising content including parameter information associated with the second client device. For example, the parameter information may include ad metadata associated with media content provided to the second client device as well as HTTP headers, cookies, URLs, or other information.

As shown in FIG. 4, the method 400 includes an act 430 of providing the request to an ad server 112. For example, in one or more embodiments, the act 430 involves providing, by the first client device, the request including the parameter information to the ad server 112. In one or more embodiments, providing the response to the ad server involves forwarding or relaying an ad call received from the first client device from the second client device to the ad server 112.

As shown in FIG. 4, the method 400 includes an act 440 of receiving a response to the request from the ad server 112.

For example, in one or more embodiments, the act 440 involves receiving, from the ad server 112, a response to the request for digital advertising content based on the parameter information associated with the second client device. In one or more embodiments, receiving the response to the request involves receiving a targeted response including targeted advertising content selected by the ad server 112 for the second client device based on the parameter information associated with the second client device.

Additionally, as shown in FIG. 4, the method 400 includes an act 450 of providing the response to the request to the second client device over the P2P connection 122. For example, in one or more embodiments, the act 450 involves providing, to the second client device over the P2P connection 122, the response to the request for advertising content. In one or more embodiments, providing the response involves streaming digital advertising content to the second client device (e.g., from the first client device).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 5:
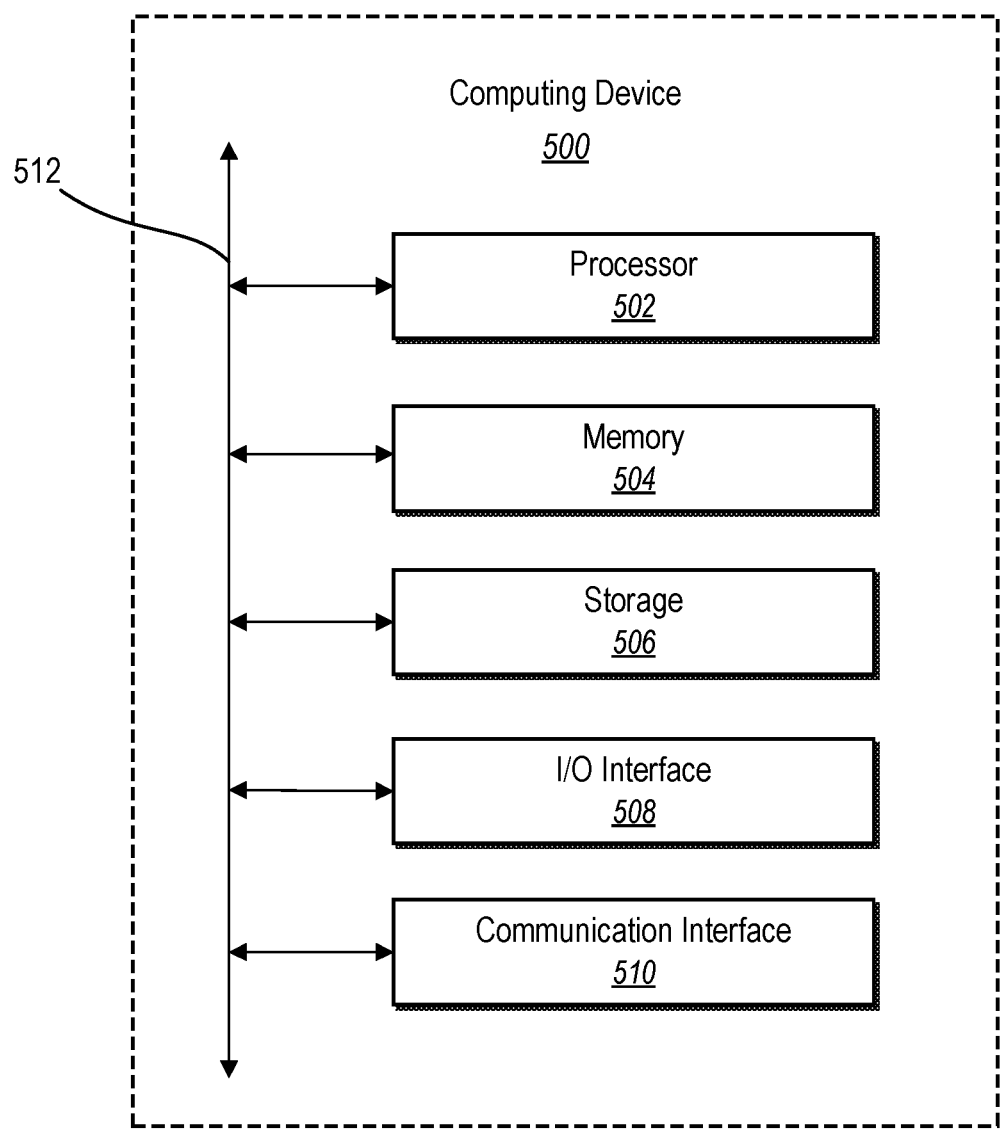
FIG. 5 illustrates a block diagram of an exemplary computing device in accordance with one or more embodiments.

FIG. 5 illustrates a block diagram of exemplary computing device 500 that may be configured to perform one or more of the processes described above. As shown by FIG. 5, the computing device 500 can comprise a processor 502, a memory 504, a storage device 506, an I/O interface 508, and a communication interface 510, which may be communicatively coupled by way of a communication infrastructure 512. In certain embodiments, the computing device 500 can include fewer or more components than those shown in FIG. 5. Components of the computing device 500 shown in FIG. 5 will now be described in additional detail.

In one or more embodiments, the processor 502 includes hardware for executing instructions, such as those making up a computer program. As an example and not by way of limitation, to execute instructions for digitizing real-world objects, the processor 502 may retrieve (or fetch) the instructions from an internal register, an internal cache, the memory 504, or the storage device 506 and decode and execute them. The memory 504 may be a volatile or non-volatile memory used for storing data, metadata, and programs for execution by the processor(s). The storage device 506 includes storage, such as a hard disk, flash disk drive, or other digital storage device, for storing data or instructions related to object digitizing processes (e.g., digital scans, digital models).

The I/O interface 508 allows a user to provide input to, receive output from, and otherwise transfer data to and receive data from computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 510 may facilitate communications with various types of wired or wireless networks. The communication interface 510 may also facilitate communications using various communication protocols. The communication infrastructure 512 may also include hardware, software, or both that couples components of the computing device 500 to each other. For example, the communication interface 510 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a client device to:
    initiate a request for digital advertising content from a server;
    detect that the request for the digital advertising content has been blocked;
    in response to detecting that the request for the digital advertising content has been blocked,
        identify a peer device that does not have an active ad-blocker configured to block requests for digital advertising content from the server; and
        based on identifying that the peer device does not have the active ad-blocker configured to block requests for digital advertising content from the server, establish a peer-to-peer (P2P) connection with the peer device that does not have the active ad-blocker;
    provide, to the peer device over the P2P connection, the request for the digital advertising content; and
    receive, from the peer device, a response generated by the server to the request for the digital advertising content.

2. The non-transitory computer readable medium of claim 1, further comprising instructions that, when executed by the at least one processor, cause the client device to:
    detect that a tracking call has been blocked; and
    provide, to the peer device over the P2P connection, a request to provide the tracking call to the server.

3. The non-transitory computer readable medium of claim 1, further comprising instructions that, when executed by the at least one processor, cause the client device to:
    detect that a tracking call has been blocked;
    in response to detecting that the tracking call has been blocked, establish a second P2P connection with a second peer device; and
    provide, to the second peer device over the second P2P connection, a request to provide the tracking call to the server.

4. The non-transitory computer readable medium of claim 1, wherein detecting that the request for the digital advertising content has been blocked comprises identifying an error response from the active ad-blocker to an attempt to send the request for digital advertising content to the server.

5. The non-transitory computer readable medium of claim 1, wherein establishing the P2P connection with the peer device comprises providing, to a discovery server, a request for discovery data comprising information associated with a plurality of nearby devices.

6. The non-transitory computer readable medium of claim 5, wherein the discovery data comprises an identification of whether one or more of the plurality of nearby devices has an active ad-blocker.

7. The non-transitory computer readable medium of claim 6, wherein establishing the P2P connection with the peer device comprises identifying, from the discovery data, the peer device from at least one of the plurality of nearby devices that does not have an active ad-blocker.

8. The non-transitory computer readable medium of claim 1, wherein:
    providing the request for the digital advertising content comprises providing parameter information associated with the client device to the peer device over the P2P connection; and
    receiving the response generated by the server comprises receiving a response comprising targeted advertising content selected by the server based on the parameter information associated with the client device.

9. The non-transitory computer readable medium of claim 8, wherein the parameter information comprises Hypertext Transfer Protocol (HTTP) headers and a uniform resource locator (URL) received via a video stream provided to the client device by a content server.

10. The non-transitory computer readable medium of claim 1, further comprising:
    receiving, by the client device, video content from a content server; and
    receiving, from the content server, advertisement metadata in conjunction with the received video content.

11. The non-transitory computer readable medium of claim 10, wherein providing the request for the digital advertising content comprises providing the received advertisement metadata to the peer device over the P2P connection.

12. The non-transitory computer readable medium of claim 11, wherein the video content comprises a video playable within a web browser on the client device.

13. The non-transitory computer readable medium of claim 1, wherein receiving the response comprises streaming digital advertising content from the peer device.

14. In a digital medium environment for serving digital advertisements over a network, a method for preventing ad-blockers from blocking advertisements, comprising:
    establishing, by a first client device, a peer-to-peer (P2P) connection with a second client device in response to identifying that the second client device has utilized an ad-blocker to block a request to a server for digital advertising content and further based on a determination that the first client device does not have an active ad-blocker configured to block requests for digital advertisement content from the server;

receiving, from the second client device over the P2P connection, a request for digital advertising content, the request comprising parameter information associated with the second client device;

providing, by the first client device, the request for digital advertising content including the parameter information to a server;

receiving, from the server, a response to the request for advertising content based on the parameter information associated with the second client device; and providing, to the second client device over the P2P connection, the response to the request for digital advertising content.

15. The method as claim 14, wherein providing the response to the request for advertising content comprises streaming digital advertising content to the second client device.

16. The method as claim 14, wherein receiving the response to the request for advertising content comprises receiving a targeted response including targeted advertising content selected by the server for the second client device based on the parameter information associated with the second client device.

* * * * *